FLOYD W. SPLETTSTOESER
INVENTOR.

BY *Herbert J. Brown*
ATTORNEY

Dec. 19, 1961   F. W. SPLETTSTOESER   3,013,431
MILK WEIGHING DEVICE FOR PIPELINE MILKING
Filed April 2, 1958   2 Sheets-Sheet 2

FLOYD W. SPLETTSTOESER
     INVENTOR.
BY Herbert J. Brown
     ATTORNEY

United States Patent Office 3,013,431
Patented Dec. 19, 1961

3,013,431
MILK WEIGHING DEVICE FOR PIPELINE MILKING
Floyd W. Splettstoeser, 3519 Rashti Court, Fort Worth, Tex.
Filed Apr. 2, 1958, Ser. No. 725,947
1 Claim. (Cl. 73—202)

This invention relates to milk weighing devices for use with any withdrawal vacuum line connected with a milking machine.

An object of the invention is to provide a device which will individually measure the total amount of milk withdrawn from cows in a pipeline milking system for computing production records.

A particular object is to provide a simplified yet accurate milk weighing device which may be connected in any withdrawal vacuum line delivering milk from a milking machine.

Another object is to provide a milk measuring or weighing device which constantly collects a portion of the total milk from a cow and whereby a true sample for testing butter fat content may be obtained.

Another object is to provide a milk weighing device which will quickly and conveniently return milk to the vacuum line after the weight of the milk has been determined.

A further object is to provide a light weight milk measuring device which may be easily moved from stanchion to stanchion.

These and other objects will become apparent from the following description and accompanying drawings, wherein.

Figure 6:
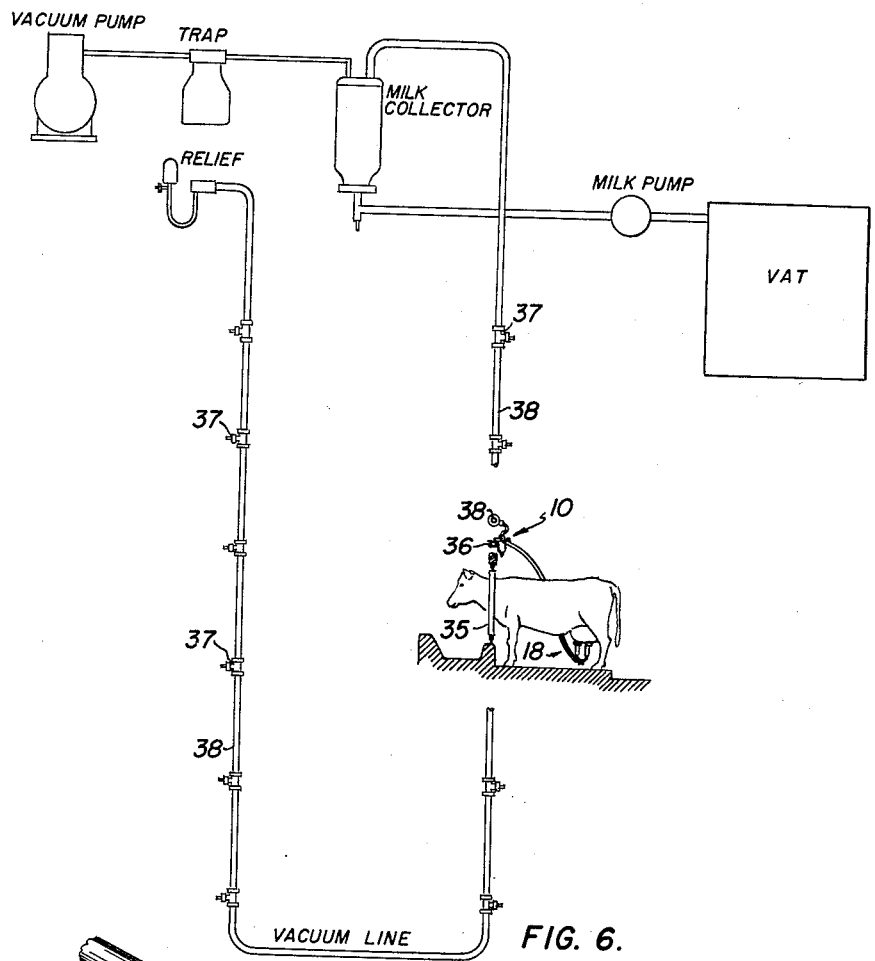
FIGURE 6 is a schematic view of a typical pipe line milking system and showing the present invention connected therewith.

In the drawings the numeral 10 designates a milk weighing or measuring device in accordance with the invention, which device includes a transparent bowl 11, a cover head 12, and fittings 13 and 14 connecting inlet and outlet passages 15 and 16 in the head with a flexible milk delivery hose 17 extending from a milking machine, the latter being generally designated by the numeral 18 in FIGURE 6. The bowl 11 is provided with projecting ears 19 for engaging lugs 20 on the bottom and opposite sides of the head 12, thus detachably securing the bowl in place; however, other securing means may be used, for example, threads around the mouth of the bowl may engage corresponding threads in the bottom of the head.

Figure 1:
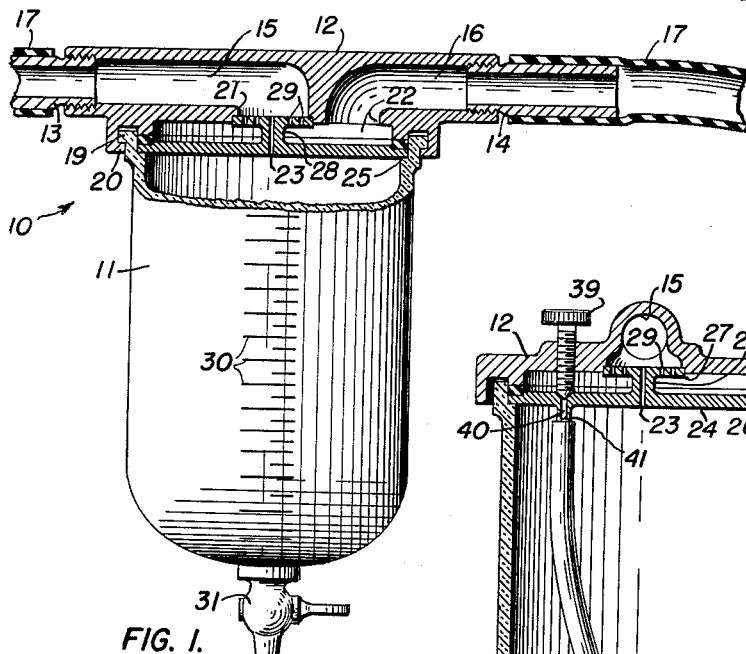
FIGURE 1 is a broken elevational and sectional view of a milk weighing device embodying the features of the invention.

The inlet passage 15 extends inwardly into the head 12 and turns downwardly at the center thereof to provide a horizontal orifice 21. Immediately below the orifice 21 there is an enlarged circular recess 22, hereinafter referred to as the flow chamber. A feature of the invention is a metering orifice 23 communicating the inlet passage 15 with the interior of the bowl 11. The metering orifice 23 is in the axial center of a disk-like bowl cover 24. The periphery of the cover 24 rests on a circular shoulder 25 in the upper end of the bowl 11, and a gasket 26 is positioned around the flow chamber 22 and engages the upper outer surface of the bowl cover. A disbursing disk 27 is integral with and spaced above the bowl cover 24 by means of an upwardly extending neck 28. The periphery of the disk 27 snugly engages the orifice 21 of the inlet passage 15, and multiple holes 29 through the disk and around the metering orifice 23 provide communication between the inlet passage 15 and the flow chamber 22. The number and diameters of the holes 29 are sufficient to provide substantially free flow of milk therethrough. As shown in FIGURE 1, the inner end of the head outlet passage 16 communicates with the flow chamber 22 outwardly of the circumference of the disbursing disk 27.

Figure 5:
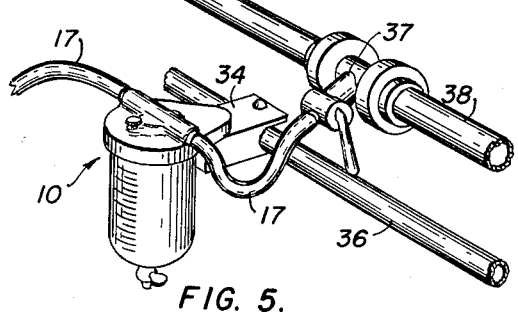
FIGURE 5 is a perspective view of the invention supported on the pulsator line of a milking system and connected with the vacuum operated milk delivery line.

Vertical calibrations 30, preferably in pounds, are provided on one side of the bowl 11 for determining liquid volume received therein, and a drain cock 31 may be provided in the bottom of the bowl for conveniently taking samples for chemically testing butter fat content. Other details of the weighing device shown include a lateral projection or arm 32 on one side of the head 12, and which arm includes a depending pin 33 for engagement in a hole (not shown) in a permanently or semi-permanently mounted bracket at each milking stanchion 35. As shown in FIGURE 5, the bracket 34 is attached to the pulsator line 36 of the milking system.

Figure 2:
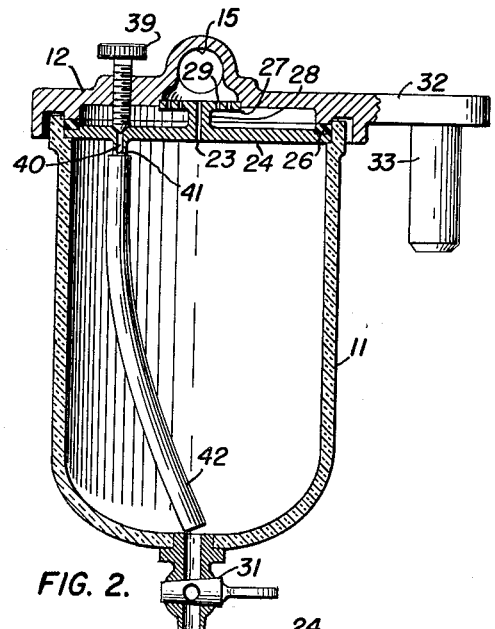
FIGURE 2 is a vertical sectional view taken at a right angle with respect to FIGURE 1.
Figure 3:
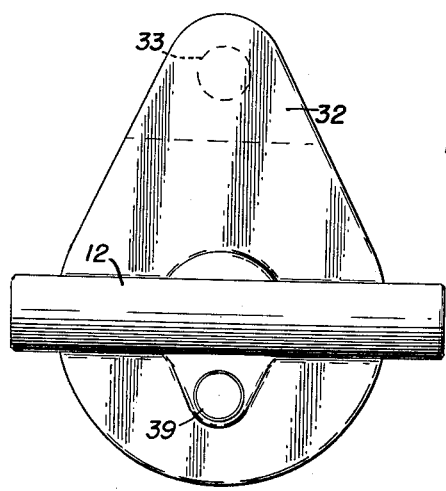
FIGURE 3 is a top plan view of FIGURE 1, but shown without the milk hose connections.
Figure 4:
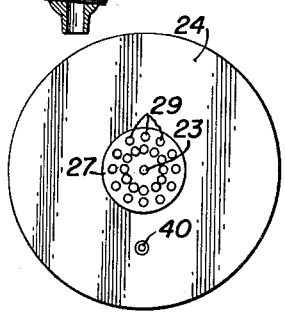
FIGURE 4 is a top plan view of the bowl cover, dispensing disk and metering orifice comprising features of the invention.

The outlet passage 16 is connected, as previously described, with the flexible milk hose 17, and the discharge end of the latter is connected with a manually operated valve 37 in the vacuum or milk collecting line 38 of the pipe line arrangement. The volume sample collected in the bowl 11 may be quickly and conveniently entrained into the vacuum line 38 by means of a needle type valve 39 threadedly engaged in the head 12. The inner end of the needle valve 39 opens and closes a port 40 in the bowl cover 24, and which port includes a depending cylindrical body 41 to which a suction tube 42 is attached. As shown in FIGURE 2, the suction tube extends to substantially the bottom of the bowl 11.

As milk flows from the milking machine 18 through the line 17, a definite proportion enters the metering orifice 23 and thence drops into the bowl 11. This metering operation continues throughout the milking of any one cow; thus, the total volume of milk withdrawn is indicated in pounds by the calibrations 30. When desired, the drain cock 31 is opened for collecting a sample for butter fat test. After the volume of milk from the cow has been determined, the needle valve 39 is opened and the milk in the bowl 11 enters the flow chamber 22 by way of the suction tube 42, and thence moves outwardly through the outlet passage 16 and through the flexible hose 17 to the vacuum line 38.

The invention is not limited to the exemplary construction herein shown and described, but may be made in various ways within the scope of the appended claim.

What is claimed is:

A device for measuring the volume of milk received from a milking machine, said device comprising: a transparent bowl having vertically arranged calibrations thereon, a head mounted on said bowl, said head including inlet and outlet passages therein, said inlet passage being connected with the discharge of said milking machine and the outlet passage being connected with a milk delivery hose, a cover over said bowl and including a vertically disposed metering orifice therethrough, the inner end of said inlet passage within said head being a horizontal orifice, a disbursing disk integral with and extending above said cover and including said metering orifice therethrough, an enlarged recess in said head below said horizontal orifice, holes through said disk communicating said horizontal orifice with said enlarged recess, means connecting said enlarged recess with said outlet passage, a vertically arranged suction tube in said bowl, the lower end of said tube extending to the bottom of said bowl and the upper end of said suction tube being connected with a port in said cover, and a valve means mounted in said head for opening and closing said port.

References Cited in the file of this patent

UNITED STATES PATENTS

| | | |
|---|---|---|
| 1,429,710 | Brayshaw | Sept. 19, 1922 |
| 2,043,636 | Thompson | June 9, 1936 |
| 2,069,677 | Ollagnon | Feb. 2, 1937 |
| 2,625,041 | Hein | Jan. 13, 1953 |